(12) United States Patent  (10) Patent No.: US 7,913,187 B2
Zhang                      (45) Date of Patent:    Mar. 22, 2011

(54) METHOD AND SYSTEM FOR UNIFIED COMMUNICATION

(75) Inventor: Wenhu Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 765 days.

(21) Appl. No.: 11/829,409

(22) Filed: Jul. 27, 2007

(65) Prior Publication Data

US 2008/0025486 A1    Jan. 31, 2008

(30) Foreign Application Priority Data

Jul. 27, 2006  (CN) .......................... 2006 1 0099119

(51) Int. Cl.
    *G06F 3/048*  (2006.01)
(52) U.S. Cl. ........ 715/825; 715/808; 715/810; 715/708; 715/711
(58) Field of Classification Search .................. 715/708, 715/711, 715, 751–759, 805, 808, 809, 810, 715/816, 825, 864; 379/355.03, 355.04, 379/355.05, 355.06, 355.07, 202.01, 205.01
See application file for complete search history.

(56) References Cited

U.S. PATENT DOCUMENTS

| 5,889,518 | A  | * | 3/1999  | Poreh et al. .................. | 715/804 |
| 5,898,419 | A  | * | 4/1999  | Liu .............................. | 345/660 |
| 6,192,258 | B1 | * | 2/2001  | Kamada et al. ............... | 455/566 |
| 6,262,735 | B1 |   | 7/2001  | Etelapera |         |
| 7,317,919 | B1 | * | 1/2008  | Ruf .............................. | 455/446 |
| 7,607,100 | B2 | * | 10/2009 | Perepa et al. ................ | 715/764 |
| 2002/0124057 | A1 |  | 9/2002 | Besprosvan |         |
| 2003/0191647 | A1 |  | 10/2003 | Kam |          |
| 2004/0239754 | A1 | * | 12/2004 | Shachar et al. ............ | 348/14.08 |
| 2005/0249346 | A1 |  | 11/2005 | Schnurr |        |

(Continued)

FOREIGN PATENT DOCUMENTS

CN   1377482 A   10/2002

(Continued)

OTHER PUBLICATIONS

Guy Lecky-Thomson, Intercepting Messages in Win32, Dec. 15, 2006, [on-line], [retreived Nov. 19, 2010]. Retrieved from the Internet URL: http://www.suite101.com/content/intercepting-messages-in-win32-a10661.*
$2^{nd}$ Office Action in corresponding Chinese Application No. 200610099119.4 (May 8, 2009).
$1^{st}$ Office Action in corresponding European Application No. 07014720.2 (Nov. 6, 2008).

(Continued)

*Primary Examiner* — Ba Huynh
*Assistant Examiner* — Rashedul Hassan
(74) *Attorney, Agent, or Firm* — Leydig, Voit & Mayer, Ltd.

(57) ABSTRACT

Embodiments of the present invention disclose a method for providing Unified Communication (UC) service, which includes obtaining communication information displayed on a terminal where a mouse locates; triggering a corresponding UC service based on the communication information. The present invention also discloses a UC client. The UC client includes a communication information obtaining unit, capable of capturing communication information displayed on a terminal where a mouse locates, and a UC service unit, capable of triggering a corresponding UC service based on the communication information. In this way a user needs to move a cursor or press a key in the active interface to enter corresponding communication information into the UC client, therefore the complicated operations of manually keying in communication information or searching an address book in the UC client interface according to conventional technique are avoided and the users' burden will be relieved.

15 Claims, 2 Drawing Sheets

U.S. PATENT DOCUMENTS

2007/0121909 A1    5/2007   Schnurr

FOREIGN PATENT DOCUMENTS

| | | |
|---|---|---|
| CN | 1606327 A | 4/2005 |
| CN | 1691006 A | 11/2005 |
| EP | 0 917 038 A2 | 5/1999 |
| EP | 1 601 169 A1 | 11/2005 |

OTHER PUBLICATIONS

Written Opinion of the International Searching Authority in corresponding PCT Application No. PCT/CN2007/001097 (Jul. 19, 2007).

International Search Report in corresponding PCT Application No. PCT/CN2007/001097 (Jul. 19, 2007).

* cited by examiner

METHOD AND SYSTEM FOR UNIFIED COMMUNICATION

This application claims priority to Chinese Patent Application No. 200610099119.4, filed Jul. 27, 2006, which is hereby incorporated by reference.

FIELD OF THE TECHNOLOGY

The present invention relates to communication technologies, and more particularly, to a method and system for providing a UC service.

BACKGROUND OF THE INVENTION

Nowadays, along with the development of communication technologies, more and more communication methods and devices emerge. Though every communication method and communication device has features and convenience of their own, every person may maintain and manage a number of contact numbers or addresses corresponding to the communication methods, for example, mobile-phone number, home phone number, office phone number, fax number, a number of email addresses, QQ number, MSN number, etc. These contact numbers or addresses bring much inconvenience to a user. A UC service system was designed to solve the problem mentioned above. A UC service adopting a unified number is based on a Next Generation Network (NGN) system, embedded into Internet and conventional intelligent services and integrated with a variety of communication methods and communication terminals. Therefore the UC service is able to provide either real time or non real time communication means for users to communicate with fixed telephone subscribers, mobile-phone subscribers or internet users. The UC service provides audio services, message services and video services, and saves instant messages, emails, voice messages and call logs in a unified information storage so that users can access, via a unified number, multiple forms of communication, e.g., telephone, short message, email, instant message, conference, etc.

In a conventional method, when a user makes a telephone call by the UC service on his user terminal, the user has to manually input a number to be called in the UC client interface or manually search for the number in an address book of the UC client. That's to say, when the user adds contact information of a new linkman into an address book of the UC client on the user terminal, the user has to manually input contact information corresponding to the linkman in the UC client interface. Such operations may bring great inconvenience to users in some scenarios. Several scenarios are described following as examples. In one scenario, an Office Automation (OA) system and a UC client are installed on a terminal of User A, who is working with the OA system while attempting to call User B, whose telephone number is saved in an address book of the OA system, via the UC service. Supposing that the UC client on the terminal of User A has been activated already, User A has to close or minimize the OA interface, shifts to the UC client interface and manually inputs the telephone number of User B to make a call to User B. Or alternatively, when the telephone number of User B is saved in an address book of the UC client, User A has to manually search on the UC client interface from the address book of the UC client for the telephone number of User B, then calls User B with the telephone number. In another application scenario, User A receives via Outlook Mail engine an email including a telephone number of a sender, e.g., User B, and User A wishes to call User B with the telephone number immediately via the UC service. And then User A has to close or minimize the Outlook interface, shifts to the UC client interface and manually inputs the telephone number of User B to make a call to User B. Or, similar to first scenario, User A has to manually search from the UC client interface for the telephone number of User B in the address book of the UC client, and calls User B with the number. In a third application scenario, User A wishes to add contact information of a correspondence, which is saved in an electronic file on the terminal of User A, into an address book of the UC client. User A still has to close or minimize the electronic file interface, shifts to the UC client interface and manually inputs the contact information to the UC client interface to add the information. Undoubtedly such complicated operations bring great inconvenience to users.

SUMMARY OF THE INVENTION

Some embodiments of the present invention provide a method for providing a UC service.

The method for providing UC service includes the processes of: obtaining communication information displayed on a terminal where a mouse locates; triggering a corresponding UC service based on the communication information.

Other embodiments of the present invention also provide a UC client, which includes: a communication information obtaining unit, capable of obtaining communication information displayed on a terminal where a mouse locates; a UC service unit, capable of triggering a corresponding UC service based on the communication information.

To sum up, embodiments of the present invention enable a UC client to obtain communication information displayed on the terminal on which the UC client is installed in the area where the cursor located, and to provide UC services based on the captured communication information. In this way, a user moves a mouse on a screen or in an active window or press a corresponding key to input corresponding communication information to the UC client, therefore the complicated operations of manually inputting corresponding communication information or searching address books in a UC client interface of conventional technology are avoided and the users' burden will be relieved.

EMBODIMENTS OF THE INVENTION

A further detailed description is hereinafter given to this invention with reference to embodiments and accompanying drawings so as to make the technical solution and merits of this invention more apparent.

In accordance with a method embodiment of the present invention, a UC client is enabled to capture, via a screen capture technique, communication information in an area where a cursor located on a terminal on which the UC client is installed, and to provide UC services based on the communication information captured. The communication information captured may include at least one of a telephone number, an email address, and a user account. The UC services may include initiating a call to a user corresponding to the communication information, sending a short message, sending an email, saving the communication information to an address book of the UC client, etc. The complicated operations of manually keying in the corresponding communication information or manually searching the address book in the UC client interface to access a corresponding UC service in conventional technology are thus avoided and the users' burden will be relieved.

Figure 1A:
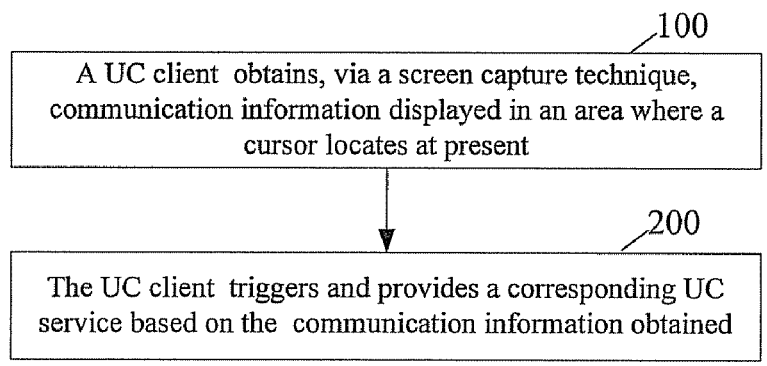
FIG. 1a is a simplified flow chart of a method for providing a UC service in accordance with an embodiment of the present invention.

Embodiments of the present invention are given hereinafter to further illustrate the present invention. In an embodiment, a UC client captures communication information displayed on a terminal on which the UC client is installed in an area where a cursor located, therefore a function for capturing the communication information from a screen has to be installed in the UC client in advance. FIG. 1a shows a flow chart of a method adopted by the embodiment, including processes described hereinafter.

In Block 100, a UC client obtains, via a screen capture technique, communication information displayed on a terminal on which a UC client is installed in an area where a cursor located at the moment.

The process can be performed according to a service demand or user's preference. For example, when the cursor locates in an area for more than a predetermined time, e.g., 0.2 second, the UC client shall capture the communication information displayed in the area where the cursor locates; or, when such a mouse key as a left key, a middle key or a right key, is activated, or two random mouse keys are activated assembled, the UC client shall capture the communication information displayed in the area where the cursor locates. Other methods for performing the process can also be adopted, e.g., when a keyboard key or a combination of keyboard keys, such as a Ctrl key, is activated, or at least one mouse key and at least one keyboard key are activated assembled, the UC client shall capture the communication information displayed in the area where the cursor locates.

In Block 200, the UC client triggers and provides a corresponding UC service based on the communication information captured.

Figure 2:
FIG. 2 is a schematic diagram illustrating a floating window displayed on a terminal for a user to choose a UC service according to an embodiment of the present invention.

The UC service can be triggered by displaying a floating window preset on a terminal screen, which includes a UC service menu for a user to choose a service and providing the corresponding UC service according to an instruction received from the user. FIG. 2 shows a schematic diagram of the floating window. For example, a menu in the FIG. 2 has three items, and each item corresponds to a UC service. For example, the UC service from which the user may choose can be offered by the floating window, and after the user selects an item in the menu, the UC client provides the UC service selected by the user according to the communication information which is used for providing the UC service. Items in the menu offered by the floating window may include: making a telephone call to a user corresponding to the communication information, sending a short message to a user corresponding to the communication information, and saving the communication information to an address book of a UC client. The user may choose any item in the menu by clicking a button. For example, when the user clicks the button of making a telephone call, the UC client invokes a telephone call interface function to initiate a call to the telephone number pointed to by the cursor. When the user clicks the button of sending a short message, the UC client displays a short message-sending window on the screen and fills a receiver number box with the telephone number captured on the screen.

When the user clicks the button of saving the communication information, the UC client displays an interface for adding an item into the address book, and automatically copies the communication information to a corresponding telephone number input box. The process of the UC client performing the UC service based on the communication information captured in this process is similar to the process in the convention technology of the UC client performing the UC service after the user manually inputs the communication information from the UC client interface, thus the process will not be explained herein.

Figure 1B:
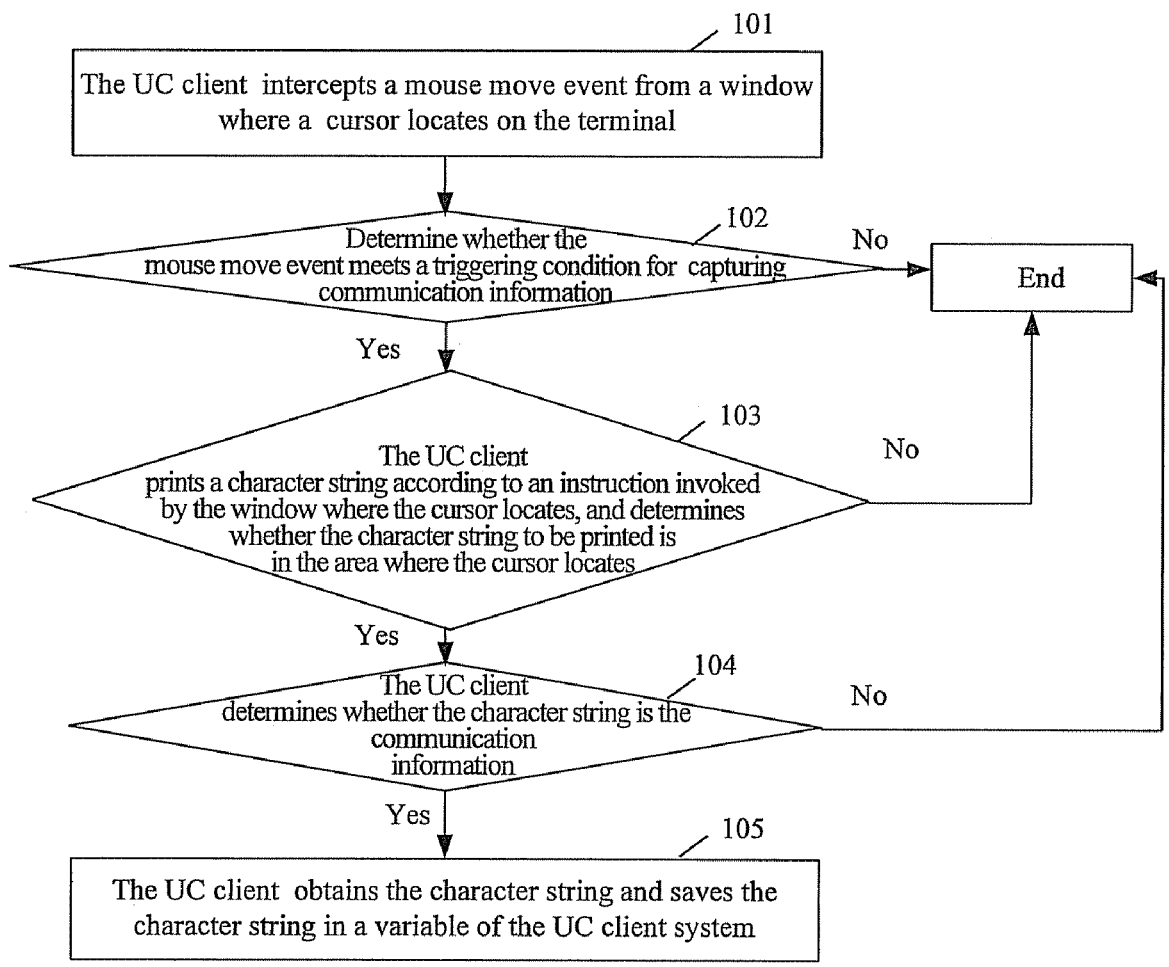
FIG. 1b is a simplified flow chart illustrating processes of capturing communication information displayed in accordance to an embodiment of the present invention.

An embodiment is given hereinafter to illustrate the application of Block 100. In the embodiment, a triggering condition for the UC client to capture the communication information in the area where the cursor locates is that the cursor locates at a location for more than a predetermined time period. FIG. 1b shows a flow chart of a method adopted by the embodiment, including the processes described hereinafter.

In Block 101, the UC client intercepts a mouse move event, which carries an instance number of a window process where the cursor locates and location information of the cursor, from a window where a cursor locates on the terminal on which the UC client is installed.

The terminal on which the UC client is installed may be a PC of the user which runs such an operation system as Windows or Linux. The UC client may intercept the mouse move event with an interface function of the operating system run on the terminal.

The Block 101 can be performed by installing a cursor hook in the operating system run on the terminal of the UC client. With the cursor hook installed, the operation system sends the corresponding mouse move event, which carries an instance number of the window where the cursor locates and the location information of the cursor, to the UC client whenever the cursor moves.

In Block 102, after intercepting the mouse move event, the UC client accesses the predetermined triggering condition for capturing the communication information displayed and determines whether the mouse move event meets the corresponding triggering condition. If the mouse move event meets the triggering condition, proceeds to Block 103; otherwise the mouse move event shall be left unprocessed and the whole process shall be terminated.

In Block 102, the predetermined triggering condition for capturing the communication information displayed may include at least one of: the cursor locates in an area for a predetermined period of time, at least one mouse key is activated, and at least one keyboard key is activated. Provided the capturing of the communication information will be triggered when the cursor locates in a fixed area for a predetermined period of time in the embodiment, when the UC client learns that the predetermined triggering condition is that the cursor locates at a fixed area for 0.2 second, the UC client initiates a timer which is used for timing and proceeds to Block 103 when the timer expires. If the UC client receives a new mouse move event before the timer expires, the UC client stops the timer and initiates a new timer. The fore-going describes the handling processes in which the triggering condition includes that the cursor locates in a fixed area for a predetermined period of time. However, in the embodiment the triggering condition may also include that at least one mouse key is activated, or at least one keyboard key is activated. The situation is simply described herein. When the UC client learns that the predetermined triggering condition is that the left key of the mouse is activated, the UC client will check whether a mouse left key activate event is received. If the mouse left key activate event is received, proceeds to Block 103, otherwise the UC client determines that the mouse move event does not meet the predetermined condition triggering and will not process the mouse move event.

In Block 103, having intercepted the mouse move event from the window process where the cursor locates, the UC client sends a repaint window event instruction to the window process. Upon receipt of the repaint window event instruction, the window process where the cursor locates repaints the window and invokes the UC client to print a character string. The UC client prints the character string specified by the window process and determines whether the character string is in the area where the cursor locates, and if the character string is in the area where the cursor locates, proceeds to Block 104, otherwise the character string will be left unprocessed and the whole process will be terminated.

Block 103 further includes the following processes:

The UC client obtains a base address of the window process in a memory according to the instance number of the window process where the cursor locates carried in the mouse move event, and further obtains, based on the base address, an address of a function invoked by the window process to print the character string on the screen, then replaces the function address with an address of a function of the client system used for capturing the communication information displayed.

Here, the function used for printing the character string on the screen can be a Textouta function in the Windows operation system.

The UC client sends the repaint window event instruction to the window process where the cursor locates, and upon receipt of the repaint window event instruction, the window process invokes a function of the UC client which is used for capturing the communication information displayed and transmits the parameter information indicating that the character string is to be printed to the function. Here the parameter information includes content and location information of the character string.

In this process, upon the receipt of the repaint window event instruction, the window invokes the function in the UC client for capturing the communication information displayed. In addition, upon the receipt of the repaint window event instruction, the window process where the cursor locates may invoke the function in the UC client for capturing the communication information for one time or several times.

The UC client prints the character string that to be printed by the window process using the function, determines whether the character string is in the area where the cursor locates, here the function is used for capturing the communication information displayed. If the character string is in the area where the cursor currently locates, Block 104 is performed. Otherwise leaves the character string unprocessed and terminates the whole process.

In this process, the UC client invokes, through the function used for capturing the communication information displayed, the function used for printing the character string on the screen, e.g., the Textouta function, to print the corresponding character string, here the function used for printing the character string on the screen is used to be invoked by the window process where the cursor locates. The UC client determines whether the character string to be printed is in the area where the cursor locates according to the current location information of the mouse carried in the mouse move event captured in Block 101.

In Block 104, the UC client determines, with the function used for capturing the communication information displayed, whether the character string is the communication information. If the character string is the communication information, proceeds to Block 105, otherwise the character string will be left unprocessed and the whole process shall be terminated.

The process of verifying whether the character string is the communication information further includes verifying whether the character string pointed to by the cursor complies with the characteristics of the communication information by the function of the UC client for capturing the communication information displayed.

In Block 105, the UC client obtains the character string and saves the character string in a variable of the UC client system.

The UC client sends the repaint window event instruction to the window process where the cursor locates. Upon receipt of the repaint window event instruction, if the window process where the cursor locates invokes for multiple times the function of the UC client for capturing the communication information displayed, the function will also be invoked for multiple times in a mouse move event and process of printing, by the UC client, the character string that to be printed by the window process, and determining whether the character string is in the area where the cursor locates to Block 105 will be correspondingly performed for multiple times.

A way to perform Block 100 is explained in the fore-going description, and Block 104, i.e. the process of verifying whether the character string to be printed is the communication information, will be further explained hereinafter. Provided the communication information is a telephone number, the characteristics of the communication information may be defined as a numeral string, length of which is between a minimum telephone number length and a maximum telephone number length, and the numeral string is allowed to include hyphens. The minimum telephone number length, the maximum telephone number length and the hyphens in a phone number may be defined by the UC client once for ado. The Block 104 may further include the following processes.

The UC client captures a character nearest to the cursor on a horizontal direction, e.g., on the right.

Determines whether the character is a number or a hyphen in a telephone number, if the character is a number or a hyphen in the phone number, saves the character according to a location of the character on the screen, captures the next character on the same direction, and determines whether the character captured is a number or a hyphen in a telephone number.

Captures a character nearest to the cursor on the opposite direction horizontally, e.g., on the left if the character is neither a number nor a hyphen in the phone number.

Determines whether the character is a number or a hyphen in a telephone number, if the character is a number or a hyphen, saves the character according to a location of the character on the screen, captures the next character on the same direction, and determines whether the character captured is a number or a hyphen in the telephone number.

If the character is neither a number nor a hyphen, determines whether the length of the character string saved is between a minimum telephone number length and a maximum telephone number length, and if the length of the character string saved is between the minimum telephone number length and the maximum telephone number length, takes the character string as the communication information and terminates the process.

If the length of the character string saved is not between the minimum telephone number length and the maximum telephone number length, determines that the character string is not the communication information.

The process disclosed in Block 104 is thus explained. The UC client first captures characters nearest to the cursor on the right and then captures characters nearest to the cursor on the left. Obviously, the UC client may also capture characters nearest to the cursor on the left first and then capture characters nearest to the cursor on the right. Block 104 may also be implemented in other ways, and the fore-going is given as an example and is not for limiting the present invention.

Embodiments of the present invention are described in detail to illustrate the way in which a UC service is launched. Here the UC client obtains, via screen capture, the communication information in the area where the cursor locates on the terminal on which the UC client is installed. However, the present invention is not limited to these embodiments, the UC client may also obtain by other means the communication information displayed (on the screen) on the terminal on which the UC client is installed. For example, the UC client may automatically obtains all communication information displayed on the terminal and a user is enabled to trigger and achieve corresponding UC service(s) based on all of the communication information.

The UC client provided by the present invention is described hereinafter. The UC client includes a UC service unit and a communication information obtaining unit, the communication information obtaining unit is used for capturing communication information displayed on a terminal on which the UC client is installed and the UC service unit is used for providing UC service based on the communication information captured.

The communication information obtaining unit may capture via a screen capture technique the communication information displayed in the area where the cursor locates on the terminal on which the UC client is installed.

The UC service unit intercepts a mouse move event of the window process where the cursor locates on the terminal on which the UC client is installed, sends a repaint window event instruction to the window process where the cursor locates, and provides a UC service based on the communication information captured by the UC client. The communication information obtaining unit prints the character string to be printed by the window process according to an invoking instruction of the window process where the cursor locates and obtains the communication information in the area where the cursor locates on the terminal on which the UC client is installed.

The communication information obtaining unit may include a function used for capturing the communication information displayed.

The UC client is equipped with all of the functions described in the fore-going description of method for implementing UC service(s). And the process of implementing, by the UC service unit, a UC service based on the communication information captured is similar to the conventional process of implementing, by the UC service unit, a UC service after a user has manually keyed in the communication information from the UC client interface, thus the process will not be explained herein.

With the method and the corresponding UC client for providing a UC service, the user can input the communication information into the UC client by directly moving a mouse or pressing corresponding key(s) on the screen, in the active window or in the interface, complicated operations including the manually keying in the communication information or searching in the address book in UC client interface according to the conventional techniques are thus avoided and the burden of the user is reduced.

It should be emphasized that the above-described embodiments, particularly, any 'preferred' embodiments, are merely possible examples of implementations, merely set forth for a clear understanding of the principles of the invention. Many variations and modifications may be made to the above-described preferred embodiments without departing substantially from the spirit and principles of the invention. All such modifications and variations are intended to be included herein within the scope of this disclosure and the above-described preferred embodiments and protected by the following claims.

What is claimed is:

1. A method for providing Unified Communication (UC) service, comprising:
   intercepting a mouse move event from a window process where a cursor locates;
   sending a repaint window event instruction to the window process where the cursor locates to repaint the window;
   printing a character string in the window;
   determining whether the character string is in the area where the cursor locates;
   determining whether the character string is the communication information if the character string is in the area where the cursor locates;
   obtaining the character string if the character string is determined to be the communication information; and
   triggering a corresponding UC service based on the communication information.

2. The method of claim 1, wherein the communication information comprises at least one of a telephone number, an email address, and a user account.

3. The method of claim 1, further comprising:
   accessing a triggering condition for capturing the communication information before sending the repaint window event instruction; and
   sending the repaint window event instruction when the mouse move event meets the triggering condition.

4. The method of claim 3, wherein the triggering condition for capturing the communication information comprises at least one of:
   the cursor locating at a location for a period of time, at least one mouse key being activated, and at least one keyboard key being activated.

5. The method of claim 1, wherein determining whether the character string is the communication information comprises:
   capturing a character nearest to the cursor in a first horizontal direction.

6. The method of claim 5, upon capturing a character nearest to the cursor in a first horizontal direction further comprising:
   saving, when the character captured in the first horizontal direction is a number or a hyphen in a phone number, the character according to a location that the character is displayed, capturing the next character in the first horizontal direction, and returning to the process of saving, when the character in the first horizontal direction is a number or a hyphen in a phone number, the character according to the location that the character is displayed.

7. The method of claim 5, upon capturing a character nearest to the cursor in a first horizontal direction further comprising: capturing, when the character in the first horizontal direction is neither a number nor a hyphen in a phone number, a character nearest to the cursor in a second horizontal direction.

8. The method of claim 7, upon capturing a character nearest to the cursor in a second horizontal direction further comprising:
   saving, when the character in the second horizontal direction is a number or a hyphen in a phone number, the character according to the location that the character is displayed, capturing the next character in the second horizontal direction, and returning to the process of saving, when the character in the second horizontal direction is a number or a hyphen in a phone number, the character according to the location that the character is displayed.

9. The method of claim 7, upon capturing a character nearest to the cursor in a second horizontal direction further comprising:
determining, when the character in the second horizontal direction is neither a number nor a hyphen in a phone number, whether a length of the character string saved is between a minimum number length and a maximum number length, if the length of the character string saved is between the minimum number length and the maximum number length, taking the character string as the communication information.

10. The method of claim 9, further comprising if the length of the character string saved is not between the minimum number length and the maximum number length, determining that the character string is not the communication information.

11. The method of claim 1, wherein triggering a corresponding UC service based on the communication information comprises:
displaying a floating window including a menu of UC services from which a user may choose, wherein each item of the menu is corresponding to a UC service;
triggering, according to the communication information which is used for triggering a UC service selected by the user, the UC service.

12. The method of claim 1, wherein triggering a UC service based on the communication information comprises at least one of: initiating a telephone call to a user corresponding to the communication information, sending a short message to a user corresponding to the communication information, sending an email to a user corresponding to the communication information and saving the communication information into an address book of the UC client.

13. The method of claim 1, further comprising:
obtaining a base address of the window process in a memory according to the mouse move event;
obtaining an address of a function invoked by the window process to print the character string on the screen based on the base address; and
replacing the function address with an address of a function of the UC client used for capturing the communication information displayed.

14. A terminal, comprising:
a UC client configured and adapted to: intercept a mouse move event from a window process where a cursor locates; send a repaint window event instruction to the window process where the cursor locates to repaint the window; print a character string in the window under invocation of the window process; determine whether the character string is in the area where the cursor is located; determine whether the character string is the communication information if the character string is in the area where the cursor is located; obtain the character string if the character string is determined to be the communication information; and trigger a corresponding UC service based on the communication information; and
a screen capable of displaying the communication information.

15. The terminal of claim 14, wherein the UC client is further capable of obtaining a base address of the window process in a memory according to the mouse move event; obtaining an address of a function invoked by the window process to print the character string on the screen based on the base address; and replacing the function address with an address of a function of the UC client used for capturing the communication information displayed.

* * * * *